US010680665B2

(12) United States Patent
Cordone et al.

(10) Patent No.: US 10,680,665 B2
(45) Date of Patent: Jun. 9, 2020

(54) SYSTEMS AND METHODS FOR FACILITATING PREDICTIVE NOISE MITIGATION

(71) Applicant: GOGO LLC, Chicago, IL (US)

(72) Inventors: Sean S. Cordone, Wheaton, IL (US); Yong Liu, Chicago, IL (US); James P. Michels, Lake Zurich, IL (US)

(73) Assignee: GOGO LLC, Chicago, IL (US)

( * ) Notice: Subject to any disclaimer, the term of this patent is extended or adjusted under 35 U.S.C. 154(b) by 0 days.

(21) Appl. No.: 16/665,450

(22) Filed: Oct. 28, 2019

(65) Prior Publication Data

US 2020/0067544 A1   Feb. 27, 2020

Related U.S. Application Data (63) Continuation of application No. 16/139,544, filed on Sep. 24, 2018, now Pat. No. 10,461,788, which is a
(Continued)

(51) Int. Cl.
*H04B 1/04* (2006.01)
*H04W 36/30* (2009.01)
(Continued)

(52) U.S. Cl.
CPC ......... *H04B 1/0475* (2013.01); *H04B 1/1036* (2013.01); *H04B 1/715* (2013.01);
(Continued)

(58) Field of Classification Search
CPC .... H04B 17/21; H04B 17/309; H04B 17/345; H04B 1/715; H04B 1/0475; H04W 36/30; H04W 24/02; H04W 24/04
See application file for complete search history.

(56) References Cited

U.S. PATENT DOCUMENTS 8,428,580 B1   4/2013 Mitchell et al.
8,818,458 B2 *  8/2014 Rahm ............... H01Q 3/26
                                                343/751
(Continued)

OTHER PUBLICATIONS

Nadembega et al., "A destination and mobility path prediction scheme for mobile networks", IEEE Transactions on Vehicular Technology, vol. 64, No. 6, pp. 2577-2590 (2015).
(Continued)

*Primary Examiner* — Devan A Sandiford
(74) *Attorney, Agent, or Firm* — Marshall, Gerstein & Borun LLP; Randall G. Rueth (57) ABSTRACT

Systems and method are provided to facilitate predictive mitigation of noise. A vehicle may measure noise floor levels and transmit a noise floor signal to a noise signal aggregator. Based on the noise signal, the noise signal aggregator may update a noise floor map database. The noise floor map database may associate a plurality of geographic locations with a plurality of noise floor levels. Accordingly, the noise signal aggregator may update a noise floor level in the noise floor map database that corresponds to the location associated with the transmitted noise signal. The noise floor map database may then be queried to retrieve noise floor levels for locations further along a route traversed by a vehicle such that the vehicle may predictively tune one or more antennas to mitigate interference associated with the noise floor.

20 Claims, 6 Drawing Sheets

Related U.S. Application Data continuation of application No. 15/642,544, filed on Jul. 6, 2017, now Pat. No. 10,084,493.

(51) Int. Cl.
*H04B 17/309* (2015.01)
*H04B 1/10* (2006.01)
*H04B 17/21* (2015.01)
*H04B 17/345* (2015.01)
*H04W 24/02* (2009.01)
*H04B 1/715* (2011.01)

(52) U.S. Cl.
CPC ........... *H04B 17/21* (2015.01); *H04B 17/309* (2015.01); *H04B 17/345* (2015.01); *H04W 24/02* (2013.01); *H04W 36/30* (2013.01)

(56) References Cited

U.S. PATENT DOCUMENTS

| | | | |
|---|---|---|---|
| 2012/0322452 A1* | 12/2012 | Samuel | H04W 36/0083 455/437 |
| 2014/0024406 A1 | 1/2014 | Lancaster et al. | |
| 2016/0212681 A1* | 7/2016 | Linden | H04L 41/0853 |
| 2016/0269964 A1* | 9/2016 | Murray | H04W 36/08 |
| 2017/0134059 A1* | 5/2017 | Eskridge, Jr. | H04W 16/14 |

OTHER PUBLICATIONS

International Search Report and Written Opinion, International Application No. PCT/US2018/040669, dated Oct. 16, 2018.

* cited by examiner

SYSTEMS AND METHODS FOR FACILITATING PREDICTIVE NOISE MITIGATION

CROSS-REFERENCE TO RELATED APPLICATIONS

The present application is a continuation of U.S. patent application Ser. No. 16/139,544, filed Sep. 24, 2018, and entitled "SYSTEMS AND METHODS FOR FACILITATING PREDICTIVE NOISE MITIGATION," which is a continuation of U.S. patent application Ser. No. 15/642,544, filed Jul. 6, 2017 (U.S. Pat. No. 10,084,493), and entitled "SYSTEMS AND METHODS FOR FACILITATING PREDICTIVE NOISE MITIGATION." The disclosures of which are hereby incorporated herein by reference in their entirety.

TECHNICAL FIELD

The following disclosure relates to systems and methods for facilitating predictive noise mitigation, and more particularly, for maintaining and utilizing a temporal noise floor map database to mitigate noise.

BACKGROUND

Currently, many vehicles contain various communications equipment to interact with a control center and/or to provide services to passengers within the vehicle. As the vehicle traverses a transport network, the vehicle may experience a wide range of different network conditions that interfere with the communications equipment. For example, due to the volume and density of communications devices within cities, vehicles traversing a route proximate to a city may detect more interference than while traversing a route in more rural environments. The interference patterns may be more pronounced for communications utilizing unlicensed spectrum within the 2.4 GHz or 5 GHz bands. In some cases, the interference may even be perceptible to airborne vehicles proximate to a city.

Modern communications equipment often includes tunable, or otherwise adjustable, antennas capable of dynamic modification to mitigate the impacts of interference. Accordingly, typical communications equipment may measure the noise floor surrounding the communications equipment and reactively adjust the antennas based upon measured noise levels. However, these techniques require the interference to first be sensed in order to take the mitigative action. Thus, the interference mitigation performance may be improved by predictively adjusting tunable antennas, such as antennas within a phased array, to mitigate the impacts of interference prior to the communications equipment actually experiencing the interference.

SUMMARY OF THE DISCLOSURE

In one embodiment, a computer-implemented method is provided. The method may include (1) requesting, by a first vehicle and from a noise signal aggregator, a noise floor level for a geographic region along a route being traversed by the first vehicle; (2) receiving, from the noise signal aggregator, the requested noise floor level; and (3) tuning, by the first vehicle, the one or more tunable antennas to mitigate interference indicated by the received noise floor level when the first vehicle reaches the geographic region.

In another embodiment, a system for predictively adjusting a one or more tunable antennas is provided. The system includes (i) the one or more tunable antennas; (ii) one or more processors; and (iii) one or more non-transitory, computer-readable storage media storing computer-executable instructions. When the instructions are executed by the one or more processors, the instructions cause the system to (1) request, from a noise signal aggregator, a noise floor level for a geographic region along a route being traversed by the first vehicle; (2) receive, from the noise signal aggregator, the requested noise floor level; and (3) tune the one or more tunable antennas to mitigate interference indicated by the received noise floor level when the first vehicle reaches the geographic region.

In yet another embodiment, a non-transitory computer-readable storage medium storing processor-executable instructions is provided. The instructions, when executed, cause one or more processors to (1) request, from a noise signal aggregator, a noise floor level for a geographic region along a route being traversed by the first vehicle; (2) receive, from the noise signal aggregator, the requested noise floor level; and (3) tune one or more tunable antennas to mitigate interference indicated by the received noise floor level when the first vehicle reaches the geographic region.

DETAILED DESCRIPTION

It should be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

As it is generally used herein, the term "noise floor map" refers to an association between a plurality of geographic locations and respective noise floor measurements. In some embodiments, the geographic locations may be particular geographic positions as defined by GPS coordinates, latitude and longitude pairs, and/or the like. In other embodiments, the geographic locations may be sectors that incorporate ranges of particular geographic locations. In some embodiments, the geographic location includes an altitude component. In these embodiments, each sector may be three-dimensional and the term "orientation" may also refer to azimuthal orientations in addition to spatial orientations.

A "noise floor measurement" generally refers to a measurement indicative of an amount of interference detected by the measuring antenna (sometimes referred to as a "noise floor level"). The noise floor is frequently represented in decibels (dB) and is indicative of the total power of all sensed signals other than one being actively monitored by the antenna (e.g., a signal received from a base station). The ratio between the monitored signals to the noise floor is referred to as a signal-to-noise ratio (SNR) for analog signals, or a carrier-to-noise ratio (CNR) for modulated signals. It should be appreciated that unless explicitly described as such, any reference to just one of SNR or CNR is done for ease of explanation and not to limit the described embodiments to only analog or digital signals. Generally speaking, CNR is a measure of the quality of the communication channel. Accordingly, boosting the carrier signal and/or filtering the noise signals generally improves the quality of the communication channel.

The noise floor levels may include measurements for a plurality of orientations. For example, a boat pulling into a harbor may detect a higher noise floor level in the direction of the harbor than in the direction of the open ocean. It should be appreciated that obtaining the measurements for the plurality of orientations may be performed by any means known in the art. In some embodiments, this may include the use of multiple omni-directional antennas. In these embodiments, the omni-directional antennas may omni-directionally measure the noise floor levels. In one embodiment, polar coordinates may be utilized represent the varying noise floor measurements for each orientation about a particular axis (e.g., a heading of the vehicle or a north axis).

As described above, the geographic location may also include an altitude component. In an airplane transport network, different types of aircraft may be capable of having different cruising altitudes. Similarly, an aircraft that is landing at or departing from an airport proximate to a major city typically has a lower altitude than an aircraft passing over the city. As noise power tends to dissipate the further away an antenna is from the source of the noise, lower altitude aircraft may sense higher noise floor levels. In another example, the radio horizon for signals sensed at the aircraft increases as a function of altitude. As a result, higher altitude aircraft may be capable of sensing sources interference that lower altitude aircraft cannot sense. Throughout the present disclosure, the noise floor measurements may occasionally be described as being a two-dimensional measurement. However, any such description is done for ease of explanation, and also envisions an altitude component that transforms the two-dimensional measurement into a three-dimensional measurement.

In an aspect, the noise floor levels tend to vary throughout the day. For example, devices that emit interfering signals, such as Wi-Fi routers or wireless TVs, typically are in greater use during the evening. As another example, the transport network may also include a higher volume of vehicles in operation at various times throughout the day. These cyclical trends in the sources of interference may be reflected in the measured noise floor levels. Accordingly, the noise floor map database may be divided into a cycle segments that illustrate these cyclical trends in the noise floor levels. In other words, the noise floor map may be considered a four-dimensional map. The duration for the cycle segment may be as short as a minute or as long as an hour, four hours, or even twelve hours. In implementations having shorter durations, a vehicle may not measure the noise floor level at each geographical location for each time period throughout the day. In an aspect, these gaps may be filled in using interpolation techniques.

Additionally, the noise floor levels may vary over the course of multiple days, weeks, months, or even years. For example, as a city expands in population, the city may become more populated with interfering devices. Thus, for cities experiencing growth, the noise floor levels may exhibit a macrotrend of slowly increasing noise power across multiple cycles in orientations directed towards these cities. Similarly, some cities are strongly associated with tourism and experience seasonal population shifts. Accordingly, the noise floor database may include a historic temporal component that captures these shifts in the noise floor levels across multiple cycles. In one implementation, the historic temporal component may be combined to produce the noise floor levels a noise floor map database returns when queried. In one implementation, a rolling average for all measurements within a fixed number of most recent cycles is utilized to combine the historic temporal components. In another implementation, noise floor measurements are assigned weight values that decrease with each cycle such that older noise floor measurements influence the stored noise floor levels less than more recent noise floor measurements.

In some embodiments, the vehicle may include a phased array of antennas to support wireless communications to other devices. Depending on the configuration of the antennas within the phased array, the formed beam may have different power characteristics at a plurality of orientations. To this end, the individual antennas may be tuned to place a null at a first orientation to mitigate the impact of noise sensed at the first orientation. Additionally, the individual antennas may be tuned to have gains at a second orientation in order to boost the signals sensed at the second orientation. As described above, this tuning may be done to maximize the CNR of the phased array by locating a null at an orientation associated with a relatively high amount of noise power and locating the gain at an orientation associated with a device with which the vehicle is communicating.

Traditionally, the phased array on the vehicle measures the noise floor levels itself to appropriately configure the antennas to improve the CNR. However, this requires that the vehicle first be subjected to the interference in order to determine an appropriate reaction that mitigates its effect. Given the high speeds at which some types of vehicles travel, the delay between measuring the noise floor levels and adjusting the antennas may cause the gains and nulls of the phased arrays to be misaligned with the interference patterns sensed at the vehicle. Thus, a vehicle that receives noise floor measurements in advance of actually experiencing the interference can predictively tune the antennas of a phase array to minimize this misalignment. As a result, predictively configuring a phased array may improve the CNR of the communications supported by the vehicle.

As another benefit, in order to accurately measure the noise floor levels, the phased array may not be permitted to transmit data while measuring the noise floor. Thus, the noise floor level measurement cycle (e.g., a receive cycle) may be constrained by a fixed number of samples that can be measured between transmit cycles. Accordingly, if the vehicle is provided advanced knowledge of the noise floor characteristics that the antennas will experience, these fixed number of samples may be spaced at a greater frequency at orientations that have a greater impact on improving the CNR (e.g., regions in the noise floor measurements with a higher rate of change with respect to orientation) and at a lower frequency at orientations that have less of an impact on improving the CNR (e.g., regions in the noise floor measurements with a lower rate of change with respect to orientation). Thus, in addition to the alignment improvements, predictively receiving the noise floor measurements may enable more precise beamforming techniques that further improve the CNR.

Figure 1:
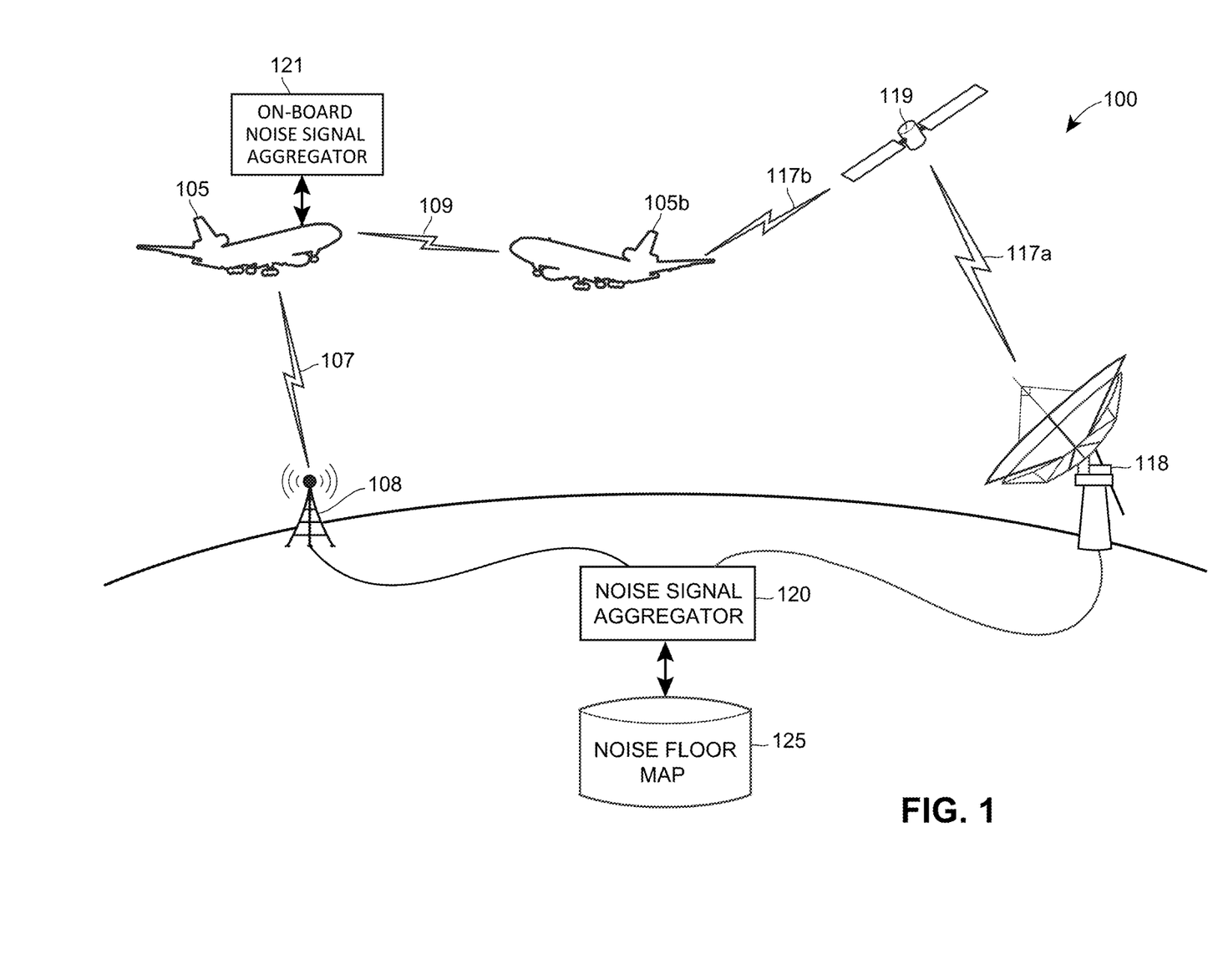
FIG. 1 depicts an embodiment of an example environment capable of facilitating predictive mitigation of noise, as described herein.

FIG. 1 depicts an example environment 100 for facilitating the predictive noise mitigation techniques described herein. The environment 100 may include one or more vehicles 105. Although the vehicles 105 are depicted as airplanes, it is envisioned that a vehicle 105 may be any vehicle, for example, a bus, a train, a subway, a helicopter, a ship, a subway, a balloon, etc. Each of the vehicles 105 may be equipped with an on-board node (not depicted), such as an Auxiliary Computer Power Unit (ACPU), that supports communications external to the vehicle 105. The on-board node may be coupled to a phased antenna array communicatively connected to one or more external communication links 107, 109 or 117. The external communication links 107, 109 or 117 may correspond to a particular communication protocol (e.g., TDMA, GSM, CDMA, GSM, LTE, WiMAX, Wi-Fi, etc.) and/or to a particular frequency band (e.g., $K_a$ band, $K_u$ band, L band, S band, Cellular band, AWS Band, PCS band, an unlicensed band, etc.). Further, the phased antenna array may be configured to scan over a plurality of orientations about the vehicle 105.

As illustrated, the vehicle 105a is communicatively coupled to a ground base station 108 via the direct external communication link 107. The external communication link 107 may be an air-to-ground (ATG) communication link and/or a communication link associated with one or more traditional terrestrial wireless networks (e.g., Verizon, AT&T, Sprint, T-Mobile, etc.). The vehicle 105b is communicatively coupled to a satellite base station 118 via the external communication link 117. Unlike the direct external communication link 107, the external communication link 117 may include a satellite 119 that acts as a relay between the satellite base station 118 and the vehicle 105b. Accordingly, the external communication link 117 may include a first communication link 117a between the satellite base station 118 and the satellite 119 and a second communication link 117b between the satellite 119 and the vehicle 105b. Additionally, multiple vehicle 105 may be directly connected to each other via the external communication link 109.

According to aspects, a noise signal aggregator 120 may be communicatively coupled with the ground base station 108 and the satellite base station 118. Thus, the vehicles 105 are capable of communicating with the noise signal aggregator 120 via the external communication links 107 and 117. For example, the vehicles 105 may transmit, to the noise signal aggregator 120, a noise floor signal and/or a request for a set of noise floor levels for a location along the route being traversed by the vehicle 105. The noise signal aggregator 120 may respond to the request by transmitting the set of noise floor levels to the requesting vehicle 105. It should be appreciated that in some embodiments, the external communication link on which the request for the set of noise floors levels is sent may be different than the external communication link whose noise floor levels are requested. For example, the vehicle 105b may transmit a request over the external satellite communication link 117 to receive noise floor measurements for a communication link within an unlicensed band of spectrum (not depicted).

The noise signal aggregator 120 may also be communicatively coupled to a noise floor map database 125 associated with a noise floor map. Upon receiving noise floor signals from the vehicles 105, the noise signal aggregator 120 may update the noise floor map database 125 to reflect the noise floor measurements included in the noise floor signal. For example, the noise signal aggregator may calculate a rolling average for the noise floor measurements such that the noise floor map database 125 reflects changing historic noise floor trends. Similarly, upon receiving a request for a set of nose floor levels from the vehicles 105, the noise floor aggregator 120 may query the noise floor map database 125 to generate a reply that includes the set of noise floor levels.

In some embodiments, the vehicle 105a may include an on-board noise signal aggregator 121 and/or a noise floor map database storing a local version of the noise floor map (not depicted). In these embodiments, noise floor signals generated at the vehicle 105a are locally routed to the on-board noise signal aggregator 121. Additionally, noise floor signals from another vehicle 105b may be sent to the on-board noise signal aggregator 121 of the vehicle 105a via the external communication link 109 rather than to the terrestrial noise signal aggregator 120. At some point in time, the vehicle 105a may communicate the local version noise floor map to the terrestrial noise signal aggregator 120 to reflect the noise floor measurements received at the vehicle 105a. To reduce network congestion, the communication of the local copy of the noise floor map maintained at the vehicle 105a may occur less frequently than if the vehicles 105 communicated the noise floor signals directly to the terrestrial noise floor aggregator 120.

Figure 2:
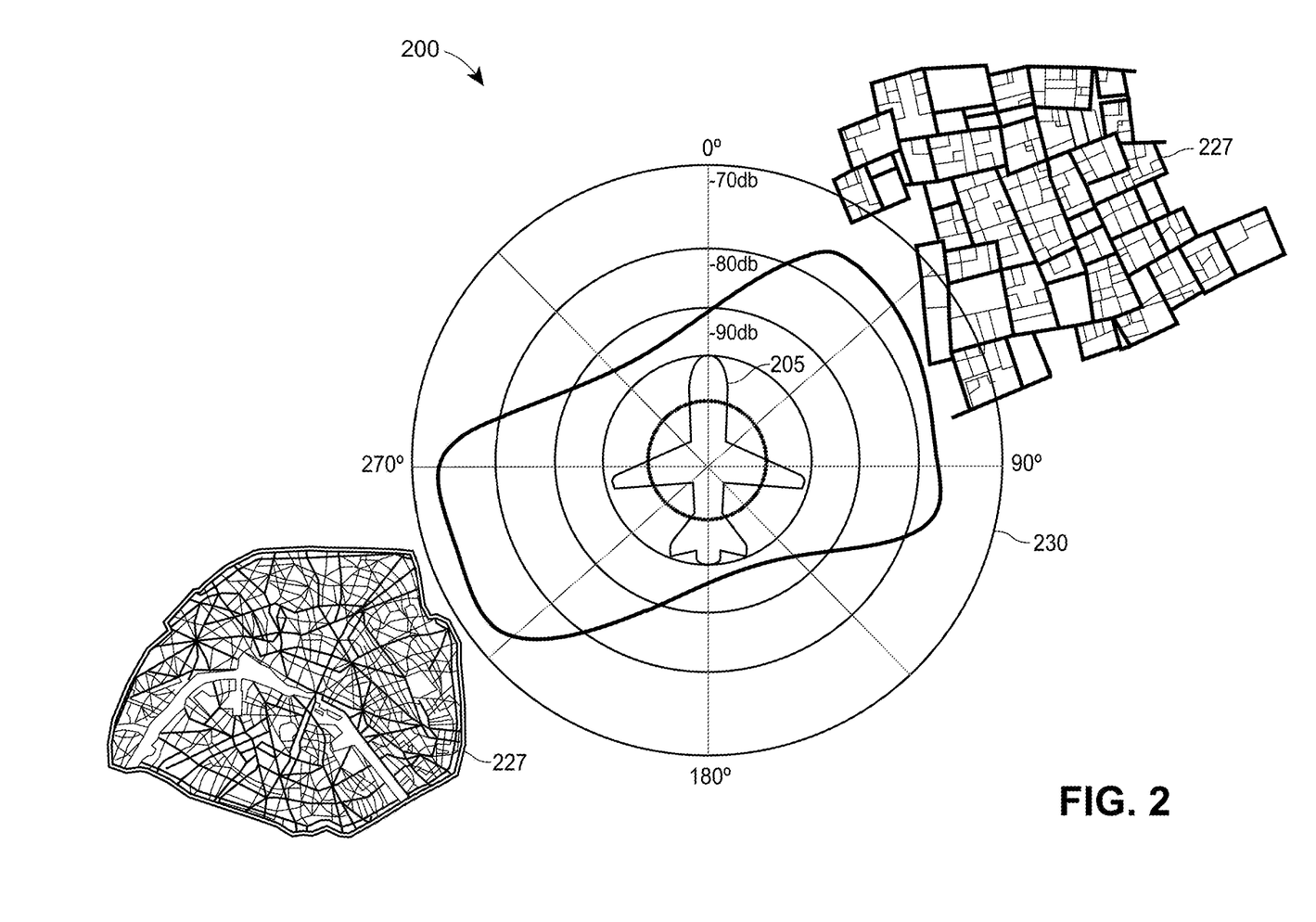
FIG. 2 depicts an example environment including a vehicle, such as one of the vehicles 105 of FIG. 1, measuring a noise floor of an geographic location, as disclosed herein.

Turning to FIG. 2, depicted is an example environment 200 including a vehicle 205, such as one of the vehicles 105 of FIG. 1, measuring a noise floor of a geographic location. According to aspects, the route traversed by the vehicle 205 may bring the vehicle 205 through a variety of different environments. For example, as illustrated, the route traversed by the vehicle 205 may bring the vehicle 205 proximate to cities 227. As described elsewhere, the cities 227 tend to be associated with higher levels of interference. Accordingly, when the vehicle 205 measures the noise floor, the vehicle 205 may detect higher noise power at orientations in the direction of the cities 227.

An example noise floor measurement 230 overlaid onto the environment 200 illustrates this effect. The noise floor measurement 230 is a polar coordinate representation of the noise floor levels for a plurality of orientations about the heading of the vehicle 205. In the overlaid graph, the further the noise floor measurement 230 is located away from the vehicle 205, the higher the noise power sensed at the vehicle 205. Accordingly, the noise floor measurement 230 includes lobes at approximately 45° and 225° that reflect the increased noise floors levels associated with the cities 227. Of course, as the vehicle 205 continues to traverse the route, the noise floor measurement 230 may reflect the new orientations and/or distances of the vehicle 205 relative to the cities 227.

Figure 3:
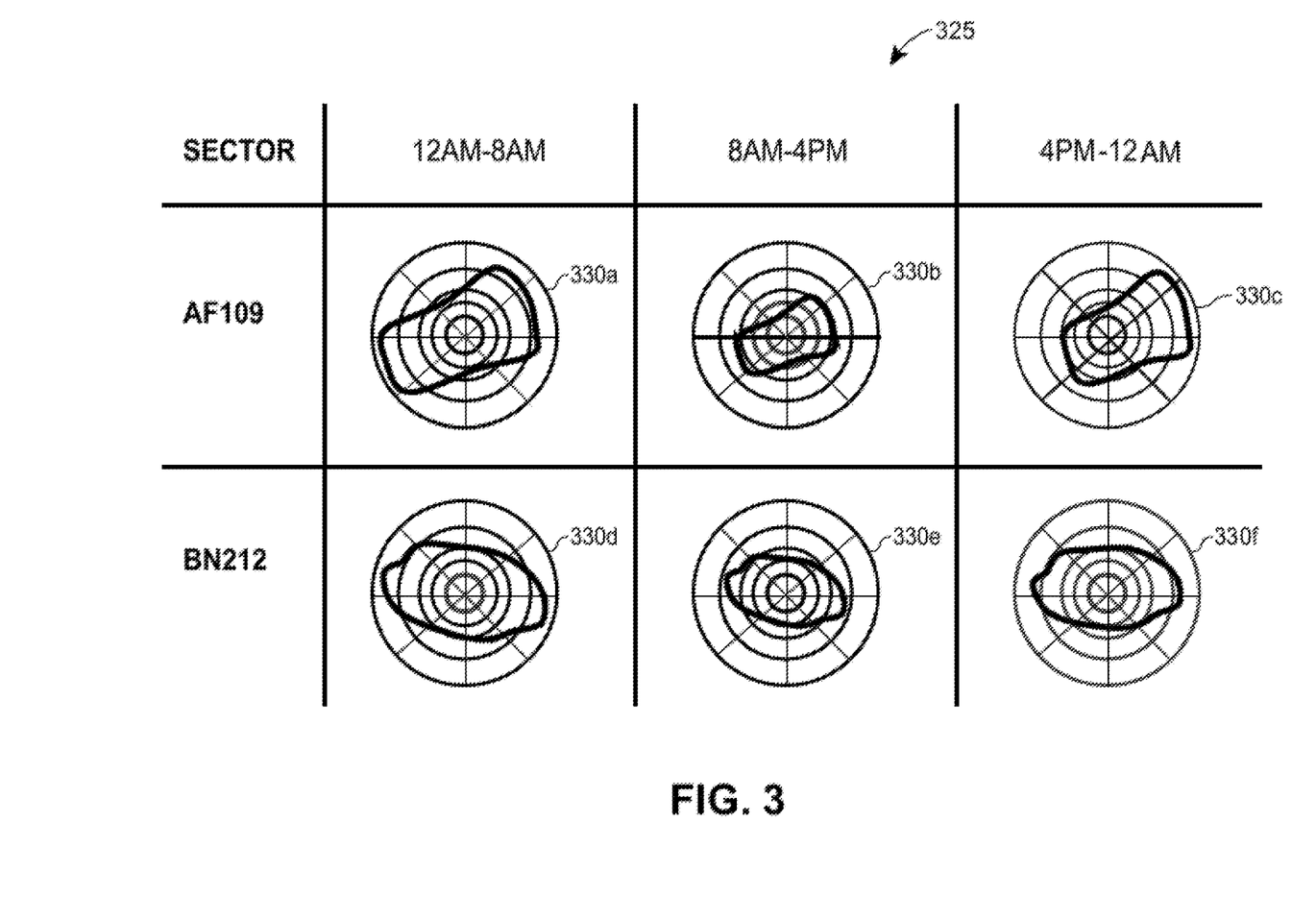
FIG. 3 depicts an example noise floor map database, such as the noise floor map database 125 of FIG. 1.

Referring to FIG. 3, depicted is an example noise floor map database 325, such as the noise floor map database 125 of FIG. 1. As depicted, the noise floor map database 325 includes a representation of the noise floor levels 330 for two sectors at various times throughout the day. It should be appreciated that although the noise floor map database 325 is organized by sectorized geographic locations, in other embodiments, the noise floor map database 325 may be organized based upon latitude and longitude or GPS coordinates.

In an aspect, the noise floor map database 325 also stores noise floor levels 330 for a plurality of cycle segments. As depicted, the cycle segment may be an eight hour period of time throughout the day. It should be appreciated that in other embodiments, the cycle segment may be any appropriate length. For example, the cycle segment may be a one hour window, a minute window, or even a second or smaller window. It should be appreciated that in embodiments with shorter cycle segments, the noise floor levels for each geographic location may not be associated with a noise floor measurement for each temporal component. Accordingly, these gaps may be filled in through the use of interpolation techniques based upon the received noise floor measurements.

Figure 4:
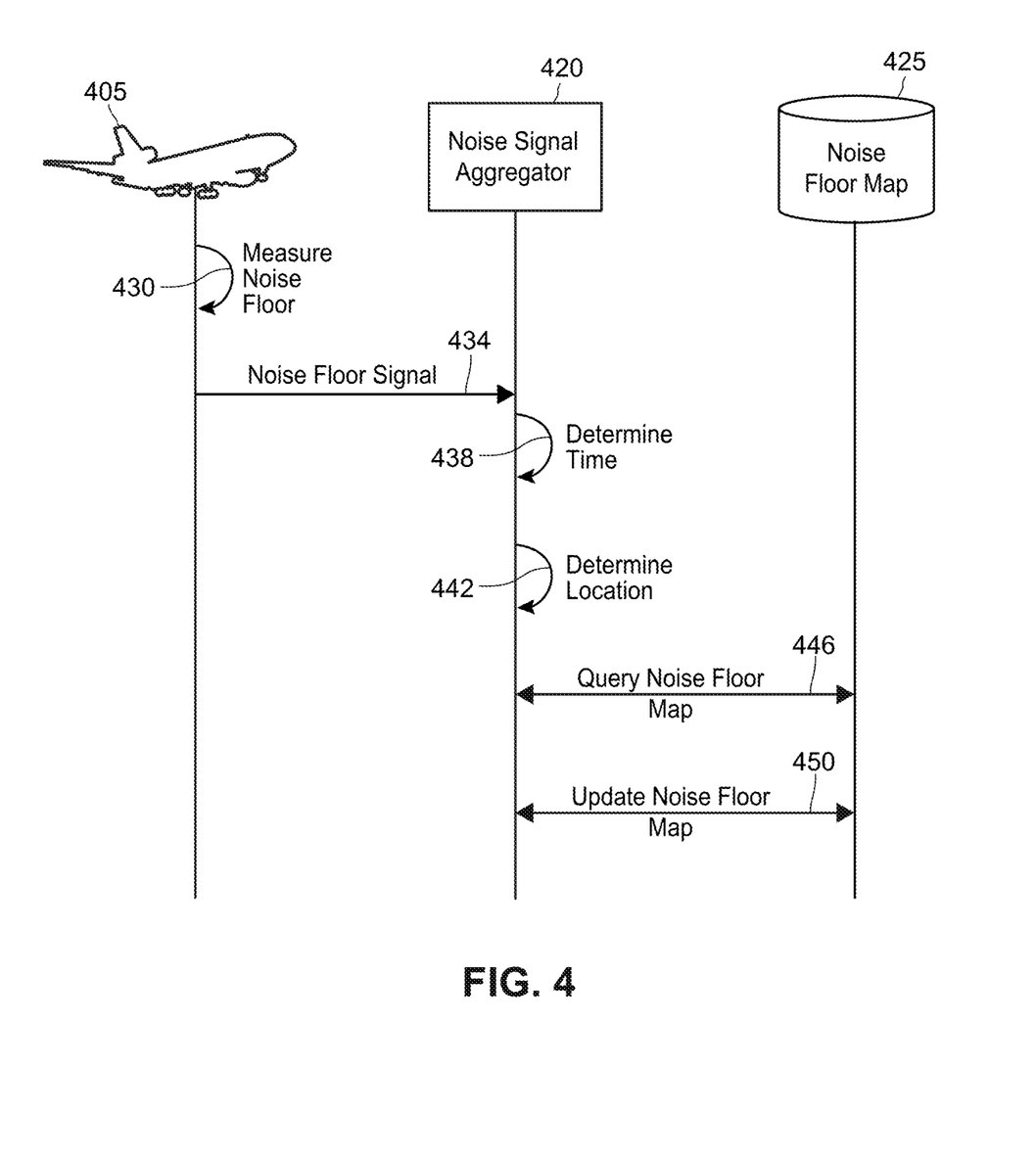
FIG. 4 depicts an example signal diagram in which a noise floor map database, such as the noise floor map database 125 of FIG. 1, is updated based on measured noise floor levels.

Turning to FIG. 4, illustrated is an example signal diagram 400 in which a noise floor map database 425, such as the noise floor map database 125 of FIG. 1, is updated based on measured noise floor levels. A vehicle 405, such as one of the vehicles 105 of FIG. 1, and a noise signal aggregator 420, such as one of the noise signal aggregator 120 of FIG. 1 or the on-board noise signal aggregator 121, may operate in conjunction to update the noise floor map database 425. Although the signal diagram 400 only depicts a single vehicle 405, alternative embodiments may include any number of vehicles 405 in communication with the noise signal aggregator 420.

The signal diagram 400 begins when the vehicle 405 measures (430) a noise floor at the current location of the vehicle 405. To measure the noise floor, one or more antennas fixedly attached to the vehicle 405 may be configured to periodically sense and/or determine the noise power at a plurality of orientations about the vehicle 405. According to aspects, the period of measurement may be temporal (e.g., every thirty seconds, every minute, every five minutes, etc.) or based on a fixed number of slot cycles. Based on the measured noise floor levels, the vehicle 405 may generate a noise floor signal.

In addition to the noise floor measurements, the vehicle 405 may include other information in the noise floor signal. For example, contemporaneous with measuring the noise floor levels, a locationing sensor at the vehicle 405 may determine a location of the vehicle 405. As another example, the vehicle 405 may generate a timestamp to indicate the time at which the noise floor levels were measured. As yet another example, the vehicle 405 may include a measurement by an altimeter in the noise floor signal.

Upon generating the noise floor signal, the vehicle 405 may transmit (434) the noise floor signal to the noise signal aggregator 420. To this end, the vehicle 405 and the noise signal aggregator 420 may be communicatively coupled via one or more external communication links (such as the external communication links 107, 109 and 117 of FIG. 1). It should be appreciated that in some embodiments, the communication link over which the noise floor signal is transmitted may be a different communication link than the communication link associated with the measured noise floor levels. Accordingly, it is not necessary for the noise floor signal 420 to be able to communicate with devices via the measured communication link.

According to aspects, the noise signal aggregator 420 may extract the information included in the noise floor signal in order to appropriately update the noise floor map database 425 In one aspect, the noise floor signal aggregator 420 may determine (438) a time at which the vehicle 405 measured the noise floor. For example, the noise floor signal aggregator 420 may extract the timestamp associated with the noise floor measurements.

In another aspect, the noise floor signal aggregator 420 may determine (442) a geographic location at which the vehicle 405 measured the noise floor. As described elsewhere herein, the geographic location may, for example, be a GPS coordinate, a latitude and longitude, or a geographic sector. In an embodiment, the noise floor signal may include an indication of a GPS coordinate, yet, in this embodiment, the noise floor map database 425 may be organized by geographic sectors. Accordingly, in this embodiment, the noise signal aggregator 420 may determine a geographic sector that encompasses the received GPS coordinate.

Using the determined time and geographic location, the noise signal aggregator 420 may query (446) the noise floor map database 425. As described elsewhere, the noise floor map database 425 may include a plurality of noise floor levels corresponding to two- (or three-) dimensional geographic locations at a plurality of cycle segments. Additionally, each of the plurality of noise floor levels may be associated with a plurality of historical noise floor levels. Accordingly, the query by the noise floor signal aggregator 420 may retrieve the plurality of historical noise floor levels associated with the time and geographic location extracted from the noise floor signal.

The noise floor signal aggregator 420 may then combine the noise floor measurements from the received noise floor signal with the plurality of historical noise floor levels retrieved from the noise floor map database 425. In implementations that utilize a rolling average to combine the historical temporal noise floor levels, the noise floor signal aggregator 420 may replace the oldest historical noise floor level with the received noise floor measurement to produce a new average noise floor level. In implementations that rely on historical weighting, the noise floor signal aggregator 420 may assign the received noise floor measurements an initial weight and correspondingly adjust the previous historical weight values. The noise floor signal aggregator 420 may then update (450) the noise floor map database 425 to indicate the calculated average noise floor level.

As described elsewhere, in some implementations, the cycle segment may be of a short enough duration that for some geographic locations, not every cycle segment is associated with a measured noise floor level. Thus, interpolation techniques may be utilized to fill in these gaps. As one example, the noise signal aggregator 420 may determine a cyclical trend for noise floor levels proximate to the geographic location associated with the gap. Based on noise floor measurements at other cycle segments and the determined trend, the noise floor signal aggregator 420 can generate an approximate noise floor level to fill in the gap. Accordingly, in implementations associated with gaps in the noise floor map database 425, when the noise signal aggregator 420 updates the noise floor map database 425, the noise signal aggregator 420 may also update any values in the noise floor map database 425 that are based on an interpolation of the updated noise floor value. Similarly, the noise signal aggregator 420 may also update any trends or models used as part of the interpolation techniques.

Figure 5:
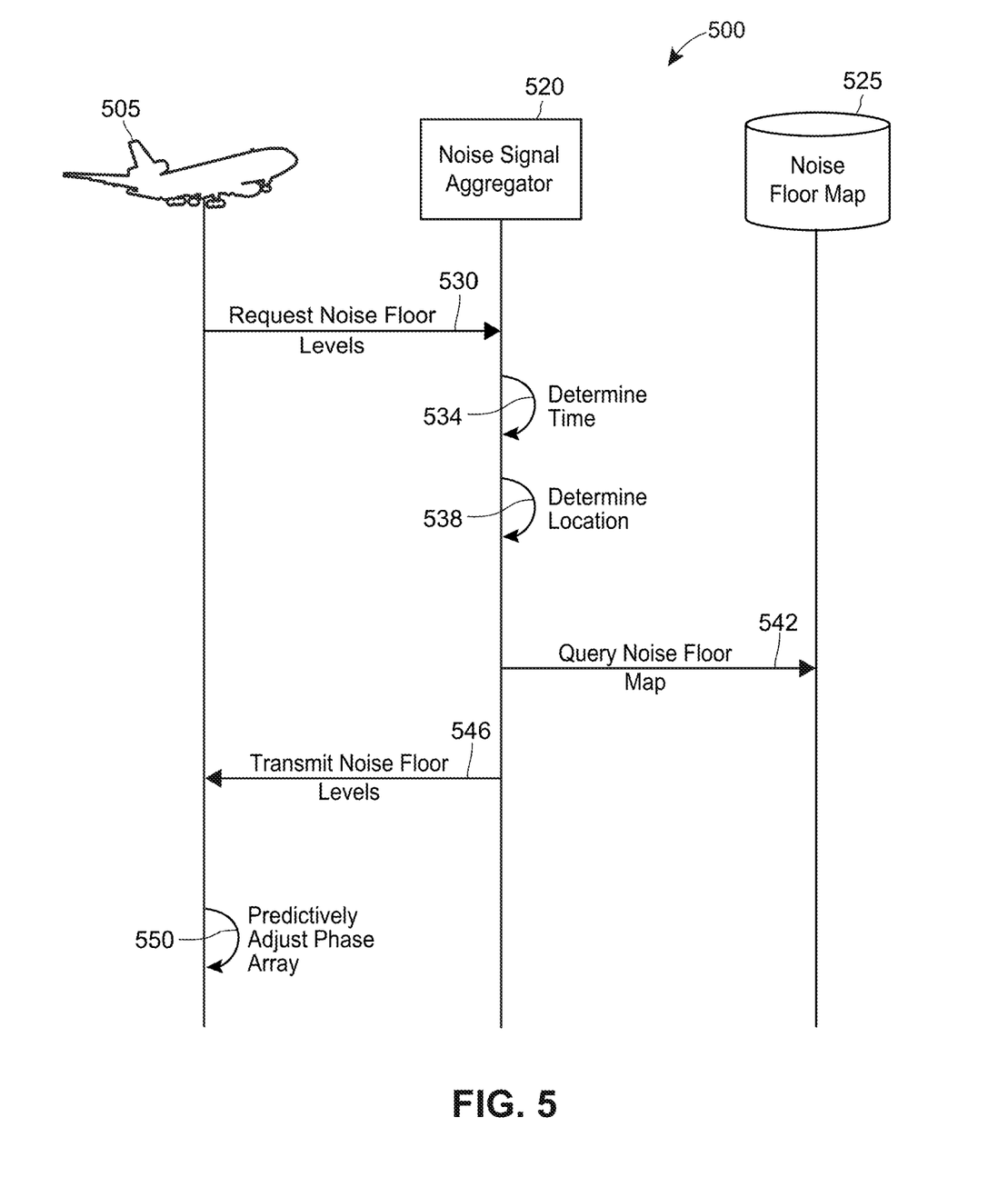
FIG. 5 depicts an example signal diagram in which a vehicle, such as one of the vehicles 105 of FIG. 1, queries a noise floor map to predictively adjust an antenna phase array.

Referring now to FIG. 5, illustrated is an example signal diagram of a vehicle 505, such as one of the vehicles 105 of FIG. 1, queries a noise floor map to predictively adjust a phased antenna array. As illustrated, the vehicle 505 communicatively coupled to a noise signal aggregator 120, such as one of the noise signal aggregator 120 or on-board noise signal aggregator 121 of FIG. 1, that has access to a noise floor map database 525, such as the noise floor map database 525. Although the signal diagram 500 only depicts a single vehicle 505, alternative embodiments may include any number of vehicles 505 in communication with the noise signal aggregator 520.

The signal diagram 500 may begin when the vehicle 505 transmits (530) a request to receive the noise floor levels for a geographic location along the route being traversed by the vehicle 505. The request may include an identification of the vehicle 505, a current geographic location of the vehicle 505 (including, in some embodiments, an altitude of the vehicle 505), an indication of the current time, a velocity of the vehicle 505, and/or an indication of a particular communication link to which the noise floor levels correspond. According to aspects, the vehicle 505 may transmit the request for the noise floor levels periodically (e.g., every second, every ten seconds, every minute, and so on), and/or in response to a trigger condition (e.g., when an average noise power exceeds a threshold amount, when the CNR drops below a threshold amount, etc.). It should be appreciated that the vehicle 505 may transmit the request to receive the noise floor levels over a different communication channel than the one to which the noise floor levels correspond.

Upon receiving the request, the noise signal aggregator 520 may determine (534) a time for which the noise floor levels should be obtained. In embodiments with shorter cycle segments, the time at which the vehicle 505 transmits the request and the time at which vehicle 505 eventually receives the response may correspond to two separate cycle segments. Accordingly, the noise signal aggregator 520 may determine a difference between the time the request was transmitted by the vehicle 505 and when the noise signal aggregator 505 receives the request. The noise signal aggregator 520 may utilize this difference to determine the cycle segment for which the noise floor levels should be obtained. In some embodiments, the delay involved in querying the noise floor map database 525 may also be a factor in determining the cycle segment for which the noise floor levels should be obtained.

Similarly, the noise signal aggregator 520 may also determine (538) a geographic location at which the noise floor levels should be obtained. According to aspects, the vehicle 505 will continue to traverse the route from the time at which the vehicle 505 transmits the request to the noise signal aggregator 520 to when the vehicle 505 receives the response. Accordingly, in order to obtain noise floor levels that are useful to predictively mitigate noise, the vehicle 505 must not have reached the geographic location associated with the queried geographic location. Thus, based on the determined time and the velocity of the vehicle 505, the noise signal aggregator 520 may determine a geographic location along the route being traversed by the vehicle 505 that the vehicle 505 will approach subsequent to receiving the response from the noise signal aggregator 520.

According to aspects, the noise signal aggregator 520 may then utilize the determined time and geographic locations to query (542) corresponding the noise floor levels in the noise floor map database 525. The noise signal aggregator 520 may then transmit (546) the noise floor levels to the vehicle 505. Upon receiving the noise floor levels, the vehicle 505 may analyze the noise floor levels to predictive adjust one or more tunable antennas to mitigate interface associated with the noise floor.

Figure 6:
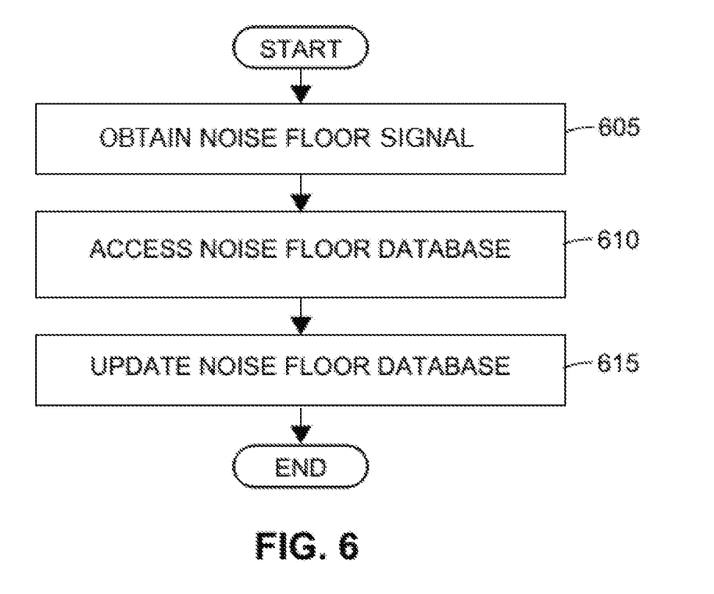
FIG. 6 is an example flow diagram of an example method for updating noise floor map database, which may be performed by the noise signal aggregator 120 of FIG. 1.

Referring now to FIG. 6, FIG. 6 depicts an example method 600 for updating a noise floor map database, such as the noise floor map database 125 of FIG. 1. The method 600 may be performed by a noise signal aggregator, such as one of the noise signal aggregator 120 or on-board noise signal aggregator 121 of FIG. 1. The noise signal aggregator may be communicative coupled to one or more vehicles, such as the vehicles 105 of FIG. 1, as well as the noise floor map database.

The method 600 may begin when the noise signal aggregator obtains a noise floor signal transmitted from an antenna fixedly attached to a first vehicle at a first point in time (block 605). The noise floor signal may indicate a location of the first vehicle, a noise floor measurement, and a time of measurement. In some embodiments, the noise floor signal may also include a heading for the vehicle. Further, the noise floor measurement may include a plurality of noise floor measurements for a plurality of orientations. In one embodiment, the noise floor measurement is associated with an unlicensed band of spectrum.

At block 610, the noise signal aggregator may access the noise floor map database. The noise floor map database may store a plurality of noise floor levels at a plurality of locations. The plurality of noise floor levels may include noise floor levels corresponding to respective locations measured within a cycle segment. In an aspect, the noise floor levels in the noise floor map database may indicate a plurality of noise floor levels for a plurality of orientations. In one embodiment, the plurality of orientations are oriented about a cardinal direction. In another embodiment, the plurality of orientations are oriented about a heading for a vehicle traversing a route that includes the particular location.

At block 615, the noise signal aggregator may update a particular noise floor level for the obtained location of the first vehicle at a cycle segment including the time of measurement by combining the particular noise floor level with the noise floor measurement. In one embodiment, updating the particular noise floor levels includes combining, at each of the plurality of orientations, the obtained plurality of noise floor measurements with the particular noise floor level at the cycle segment including the time of measurement. In embodiments in which the noise floor measurements are oriented about the heading of the vehicle whereas the noise floor levels in the noise floor map database are oriented about a cardinal direction, combining the noise floor measurements with the noise floor levels may include normalizing the obtained plurality of noise floor measurements to be oriented about the cardinal direction.

In one embodiment, the particular noise floor level is calculated as a rolling average of historical noise floor levels. Accordingly, combining the particular noise floor levels with the noise floor measurement includes calculating a new rolling average based upon the noise floor measurement. In another embodiment, the particular noise floor level is calculated as a weighted average of historical noise floor levels. In these embodiments, combining the particular noise floor level with the noise floor measurement includes associating the noise floor measurement with an initial weight and decreasing the weight associated with at least one historical noise floor measurement.

In some embodiments, the method 600 may also include receiving, from a second vehicle, a request for a noise floor level for a location along a route being traversed by the second vehicle. Responsive to receiving the request from the second vehicle, the noise signal aggregator may retrieve, from the noise floor map database, the set of noise floor levels for a location along the route being traversed by the second vehicle and transmit, to the second vehicle, the set of noise floor levels for the location along the route being traversed by the second vehicle.

Figure 7:
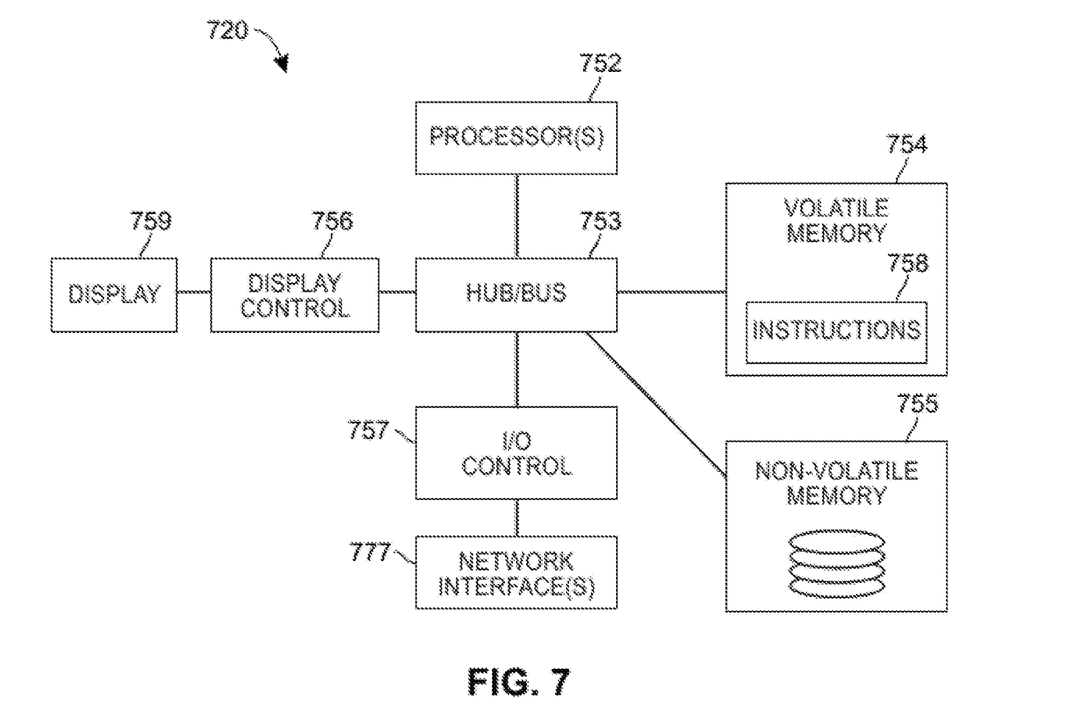
FIG. 7 is a block diagram of a noise signal aggregator, the noise signal aggregator 120 of FIG. 1, capable of updating and/or querying a noise floor map database.

FIG. 7 illustrates a block diagram of an example noise signal aggregator 720 (such the noise signal aggregator of FIG. 1) capable of maintaining a noise floor map database as described herein. The noise signal aggregator 720 may include, for example, one more central processing units (CPUs) or processors 752, and one or more busses or hubs 753 that connect the processor(s) 752 to other elements of noise signal aggregator 720, such as a volatile memory 754, a non-volatile memory 755, and an I/O controller 757. The volatile memory 754 and the non-volatile memory 755 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 754 and/or the memory 755 may store a noise signal aggregation application 758 that is executable by the processor 752. To this end, the noise signal aggregation application 758 may include a set of instructions that, when executed by the processor 752, cause the electronic device to perform various functions described elsewhere herein. For example, the noise signal aggregation application 758 may include instructions that update and/or maintain a noise floor map database. As another example, the noise aggregation application may include detecting a request for a noise floor level and providing the requested noise floor levels to a vehicle. The memory 754 and/or the memory 755 may further store other instructions beyond the noise signal aggregation application 758.

In an embodiment, the I/O controller 757 may communicate with the processor(s) 752 to transfer information and commands to/from the user interface 760, which may include a button, a slider, a keyboard, a soft key, lights, a speaker, a microphone, etc. In an embodiment, at least portions of the display device 759 and of the user interface 760 are combined in a single, integral device, e.g., a touch screen. Additionally, data or information may be transferred to and from the noise signal aggregator 720 via network interface 777. The noise signal aggregator 720 may include more than one network interface 777, such as network interfaces that operate at an unlicensed band of spectrum, at an LTE band, at a satellite communications band (e.g., Ku, Ka, L, S, etc.).

The illustrated noise signal aggregator 720 is only one example of a noise signal aggregator suitable to be particularly configured to support the functionality described herein. Other embodiments of the noise signal aggregator 720 may also be particularly configured to support the disclosed functionality, even if the other embodiments have additional, fewer, or alternative components than shown in FIG. 7, have one or more combined components, or have a different configuration or arrangement of the components. Moreover, the various components shown in FIG. 7 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computer-implemented method of predictively adjusting a one or more tunable antennas comprising:
   requesting, by a first vehicle and from a noise signal aggregator, a noise floor level for a geographic region along a route being traversed by the first vehicle;
   receiving, from the noise signal aggregator, the requested noise floor level; and
   tuning, by the first vehicle, the one or more tunable antennas to mitigate interference indicated by the received noise floor level when the first vehicle reaches the geographic region.

2. The method of claim 1, wherein:
   the request for the noise for level includes an indication of a first time.

3. The method of claim 2, wherein receiving the requested noise floor level comprises:
   receiving a particular noise floor level from a plurality of noise floor levels, the particular noise floor level associated with a cycle segment selected from a plurality of cycle segments based upon the first time.

4. The method of claim 3, wherein:
   the particular noise floor is selected based upon a time difference between when the request was sent and when the request was received.

5. The method of claim 1, wherein requesting the noise floor level occurs periodically.

6. The method of claim 1, wherein requesting the noise floor levels comprises:
   detecting the occurrence of a trigger condition; and
   requesting the noise floor level in response to detecting the trigger condition.

7. The method of claim 6, wherein detecting the occurrence of the trigger condition comprises:
   detecting that an average noise power exceeds a threshold level.

8. The method of claim 6, wherein detecting the occurrence of the trigger condition comprises:
   detecting that an carrier to noise ratio (CNR) drops below a threshold level.

9. The method of claim 1, wherein the received noise floor levels include a plurality of noise floor levels for a plurality of orientations.

10. The method of claim 9, wherein tuning the one or more tunable antennas to mitigate interference comprises:
tuning the one or more antennas such that a null is located at a particular orientation of the plurality of orientations associated with a local maximum of noise power.

11. The method of claim 1, wherein:
requesting the noise floor level comprises transmitting a request over a first communication channel; and
the noise floor level is associated with a second communication channel.

12. The method of claim 1, wherein the one or more tunable antennas form a phased antenna array.

13. A system for predictively adjusting a one or more tunable antennas comprising:
the one or more tunable antennas;
one or more processors; and
one or more non-transitory, computer-readable storage media storing computer-executable instructions, wherein when the instructions are executed by the one or more processors, the instructions cause the system to:
request, from a noise signal aggregator, a noise floor level for a geographic region along a route being traversed by the first vehicle;
receive, from the noise signal aggregator, the requested noise floor level; and
tune the one or more tunable antennas to mitigate interference indicated by the received noise floor level when the first vehicle reaches the geographic region.

14. The system of claim 13, wherein to request the noise floor level, the instructions, when executed, cause the system to:
detect that an average noise power exceeds a threshold level; and
in response to detecting the average noise power exceeding the threshold, request the noise floor level.

15. The system of claim 13, wherein to request the noise floor level, the instructions, when executed, cause the system to:
detect that an carrier to noise ratio (CNR) drops below a threshold level; and
in response to detecting the CNR dropping below the threshold, request the noise floor level.

16. The system of claim 13, wherein the received noise floor levels include a plurality of noise floor levels for a plurality of orientations.

17. The system of claim 16, wherein to tune the one or more tunable antennas to mitigate interference, the instructions, when executed, cause the system to:
tune the one or more antennas such that a null is located at a particular orientation of the plurality of orientations associated with a local maximum of noise power.

18. The system of claim 13, wherein to receive the requested noise floor level, the instructions, when executed, cause the system to:
receive a particular noise floor level from a plurality of noise floor levels, the particular noise floor level associated with a cycle segment selected from a plurality of cycle segments based a time included in the request for the noise floor level.

19. The system of claim 13, wherein the one or more tunable antennas form a phased antenna array.

20. A non-transitory computer-readable storage medium storing processor-executable instructions, that when executed cause one or more processors to:
request, from a noise signal aggregator, a noise floor level for a geographic region along a route being traversed by the first vehicle;
receive, from the noise signal aggregator, the requested noise floor level; and
tune one or more tunable antennas to mitigate interference indicated by the received noise floor level when the first vehicle reaches the geographic region.

* * * * *